United States Patent [19]
Latham et al.

[11] 3,975,731
[45] Aug. 17, 1976

[54] AIRBORNE POSITIONING SYSTEM

[75] Inventors: Roy W. Latham, Orient, N.Y.;
Albert N. Schultz, Jr., Charlotte, N.C.

[73] Assignee: Grumman Aerospace Corporation, Bethpage, N.Y.

[22] Filed: Dec. 10, 1974

[21] Appl. No.: 531,342

[52] U.S. Cl. ............................ 343/7.3; 235/150.27; 343/5 DP
[51] Int. Cl.$^2$ .......................................... G01S 9/56
[58] Field of Search .......................... 343/5 DP, 7.3; 235/150.27

[56] References Cited
UNITED STATES PATENTS

| | | |
|---|---|---|
| 3,403,396 | 9/1968 | VanPopta et al. ................... 343/7.3 |
| 3,579,237 | 5/1971 | Steingart et al. ............. 343/5 DP X |
| 3,603,994 | 9/1971 | Williams et al. ............... 343/5 DP X |
| 3,618,089 | 11/1971 | Moran ............................. 343/7.3 X |
| 3,668,403 | 6/1972 | Mellander ..................... 343/5 DP X |

*Primary Examiner*—T.H. Tubbesing
*Attorney, Agent, or Firm*—Morgan, Finnegan, Pine, Foley & Lee

[57] ABSTRACT

An airborne positioning system for acquiring range information from at least three distance measuring equipment (DME) stations, including a computer controlled range gate and means for estimating and removing bias errors from range measurements and smoothing noise to accurately determined aircraft position to typically better than 100 feet circular error probable (C.E.P.).

17 Claims, 4 Drawing Figures

AIRBORNE POSITIONING SYSTEM

The present invention relates to an airborne positioning system, and more particularly, to an airborne positioning system which utilizes the range information from at least three distance measuring equipment (DME) stations and techniques for estimating and removing range bias errors and smoothing noise to provide an accurate determination of aircraft position to typically 100 feet circular error probable (C.E.P.) or better. (DME is an internationally standardized pulse-ranging system for aircraft, operating in the 960 to 1215 MHz band, and is employed in the civil aviation VOR/DME system adopted internationally by the ICAO. DME is also part of the TACAN system used by the United States military.)

All radio positioning systems are subject to random errors resulting from equipment noise and variations in propagating media. The classical method of characterizing the error performance of a system is to find the radius of the circle centered on the point of zero error which encloses half of the scattered points. The length of this radius is called the circular error probable (C.E.P.) of the system.

In the typical use of the DME system of radio aids to navigation, a DME range measurement is used with a separate bearing measurement from a single station to indicate aircraft position. The use of two range measurements, one from each of two stations, has been recognized as a way of obtaining greater accuracy in determining aircraft position. Systems using the standard range and bearing mode of operation are known as rho-theta systems, and systems using two ranges are known as rho-rho systems. The rho-rho systems generally utilize two DME receivers in the aircraft, one for each station. Since the circles of constant range from two DME stations will usually intersect at two points, the rho-rho systems require a bearing measurement or some other means to eliminate this ambiguity in position to provide an automatic determination of aircraft position. Moreover, with rho-rho systems, accuracy degrades as a function of geometry. That is, performance is no better than the conventional rho-theta system when the aircraft is located on the imaginary line that joins the two stations.

As the airspace continues to become increasingly more crowded, particularly in areas of high aircraft congestion, i.e., near airports, the need for a more accurate determination of aircraft position becomes increasingly more important. Presently, an accurate determination of aircraft position is useful in airborne mapping and the testing of navigation and weapon systems.

It is an object of the present invention to provide an airborne positioning system affording improved accuracy in determining aircraft position.

It is a further object of the present invention to provide a system which will eliminate the ambiguity and errors present in existing aircraft positioning systems.

It is a further object of the present invention to provide a system for accurately determining aircraft position which can be utilized with existing DME stations.

It is a further object to attain improvements in positioning accuracy of aircraft without placing excessive demands upon the capacity of existing DME stations.

It is a further object of the present invention to provide an accurate airborne positioning system at a reasonable cost.

Set forth below is a general comparison of the accuracy (C.E.P.) of known positioning systems with the present invention. (Any future revisions in this data would probably be in the nature of refinements rather than substantial changes.)

| System | Station Loading (Interrogations per second) | Accuracy In Feet (Circular Error Probable) | |
|---|---|---|---|
| | | Typical | Worst |
| Conventional VOR/ DME or TACAN | 5 | 2000 | 2000+ |
| Rho-Rho (Dual DME) | 10 | 600 | 2000+ |
| Present Invention high rate | 10 | 75 | 200 |
| Present Invention low rate | .7 | 200 | 400 |

Other objects, aspects, and advantages of the present invention will be apparent when the detailed description is considered with the drawings.

Briefly, the airborne positioning system includes the method of and associated apparatus for acquiring range signals from at least three DME stations, rapidly sequencing among the plurality of individual DME stations by providing a predicted range measurement to the next DME station in a range gate, comparing the predicted range measurement with the actual range measurement determined from the transponded pulses, estimating range bias errors in the actual range measurement associated with each DME station, subtracting the range bias error from the actual range measurement to provide a corrected range measurement to the DME stations, and continuously updating the estimated range bias errors and estimated aircraft velocity to provide an accurate determination of aircraft position relative to the DME stations.

The present invention is illustrated in the accompanying drawings, in which.

Figure 1:
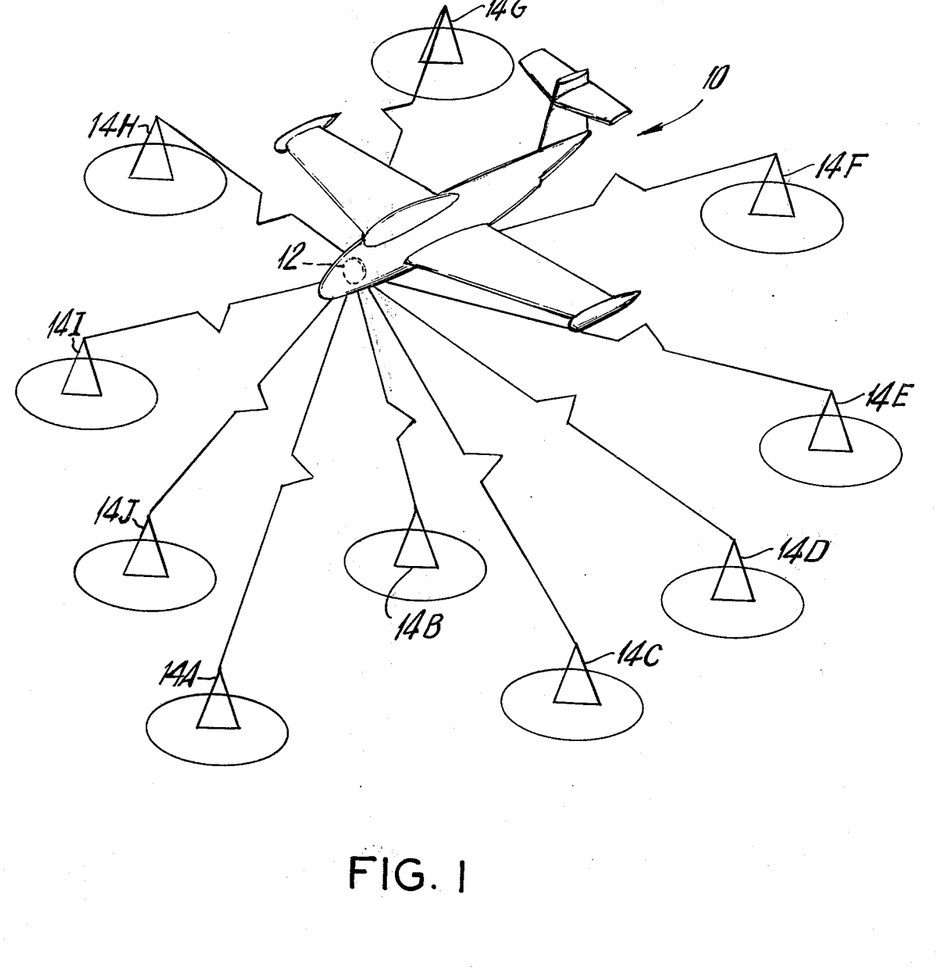
FIG. 1 is a perspective view of an aircraft carrying the apparatus of the present invention shown receiving transponded pulses from 10 DME ground stations.

Referring to FIG. 1, an aircraft 10 is shown carrying the airborne positioning system 12 of the present invention. The aircraft 10 is shown receiving signals from 10 DME stations 14 A–J. The airborne positioning system 12 rapidly sequences among a predetermined number of stations, e.g., 10 stations, to determine the range to each station 14 as will be more fully explained below.

It has been determined that for times soon after the system is activated the accuracy for three or more DME stations will improve in proportion to the square root of the number of stations used. (Later, as the station biases are estimated, the station sequencing rate becomes the principal accuracy factor.) The number of stations to be used will be adjusted according to the number available on a particular flight path. It is assumed that 10 DME stations is the largest number of stations consistently available.

There are presently over 750 DME ground stations in the United States. A detailed discussion of the background and operation of DME systems is found in *Navigation Systems, A Survey of Modern Electronic Aids*, by G. E. Beck, published by Van Nostrand Reinhold Company, London, 1971, at pp. 268–276.

DME has been used predominantly as part of a range-bearing system. The range information is obtained by determining the time in transit of a pulse pair emitted by the aircraft transceiver and transponded by the DME ground station. Bearing information is derived from TACAN bearing or VOR equipment that is usually located at the DME station. Aircraft position is then estimated from the received range and bearing information. Typically, navigation updates are made at the rate of about five per second.

The DME station is designed to emit pulse pairs at a rate of about 2700 per second, and is capable of accommodating about 4000 aircraft. If more than the maximum number of aircraft attempt to use the DME station, the station automatically reduces the gain on its receiver so that only the stronger pulses are transponded. If fewer than 2700 pulses are received, the station receiver gain is increased until noise triggers enough responses to maintain the 2700 pulse per second rate. Thus, a constant transmitter duty cycle is maintained independently of aircraft loading.

Figure 2:
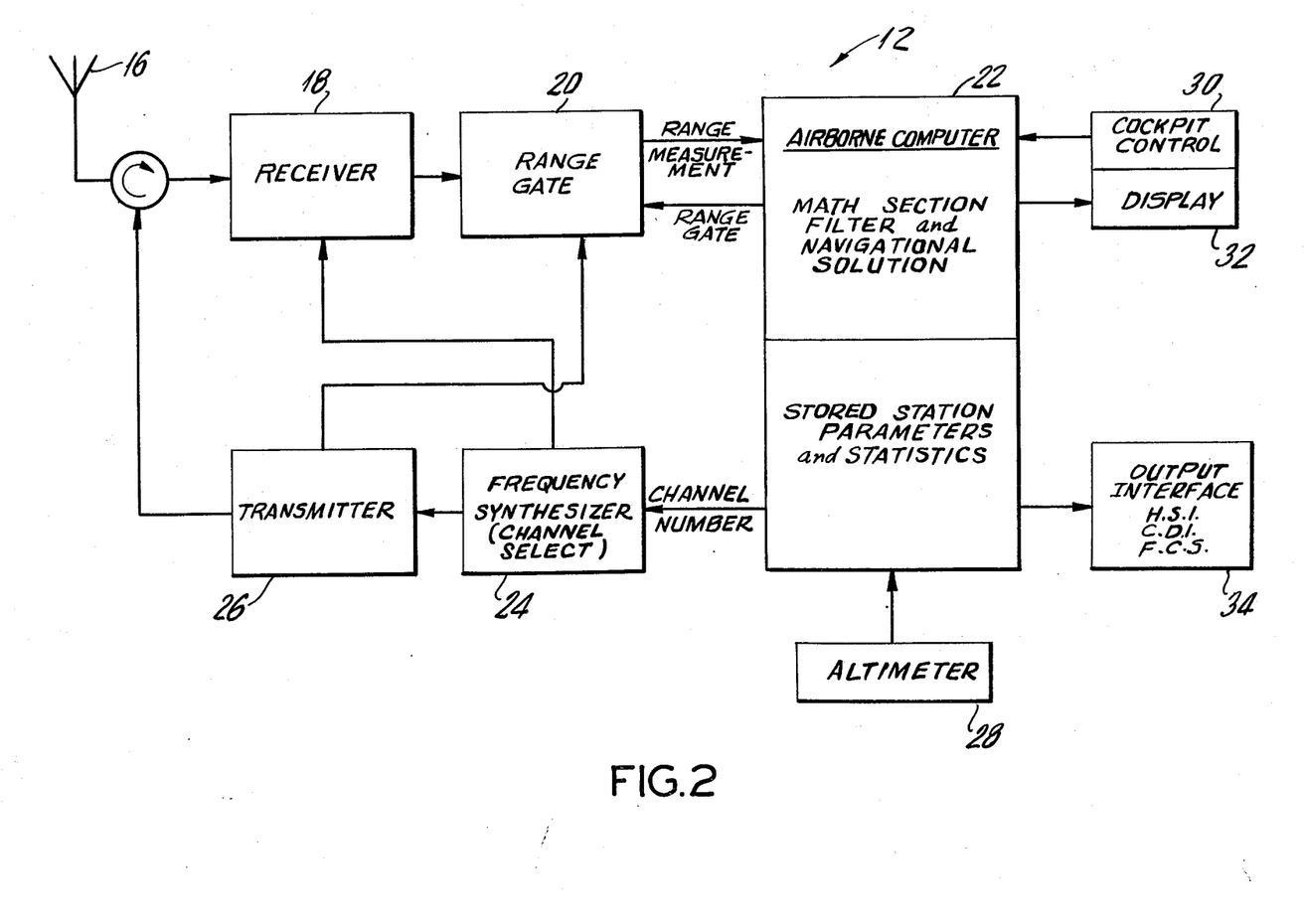
FIG. 2 is a general block diagram of the apparatus of the present invention.

Referring to FIG. 2, the airborne positioning system generally indicated at 12 utilizes only range information. The system 12 includes an antenna 16 electrically coupled to a receiver 18 which is in turn electrically coupled to a range gate 20. The range gate 20 excludes pulses from the DME stations 14 which are intended for other aircraft. The range gate 20 is electrically coupled to and controlled by a digital computer 22, e.g., Rolm Corp. Model 1602. The computer 22 is also electrically coupled to a frequency synthesizer 24 which supplies output signals of a preselected frequency to the receiver 18 and a transmitter 26. The output sgnals (pulse pair) from the transmitter 26 are fed to the antenna 16 and transmitted to the DME ground stations.

The computer input includes a range measurement signal from the range gate 20, a signal from an altimeter 28 and control signals from the cockpit control 30. The computer output includes a range gate control signal to the range gate 20, a channel number control signal to the frequency synthesizer 24, and display signals to display 32, and interface signals to the output interface 34 for other aircraft systems.

Figure 3:
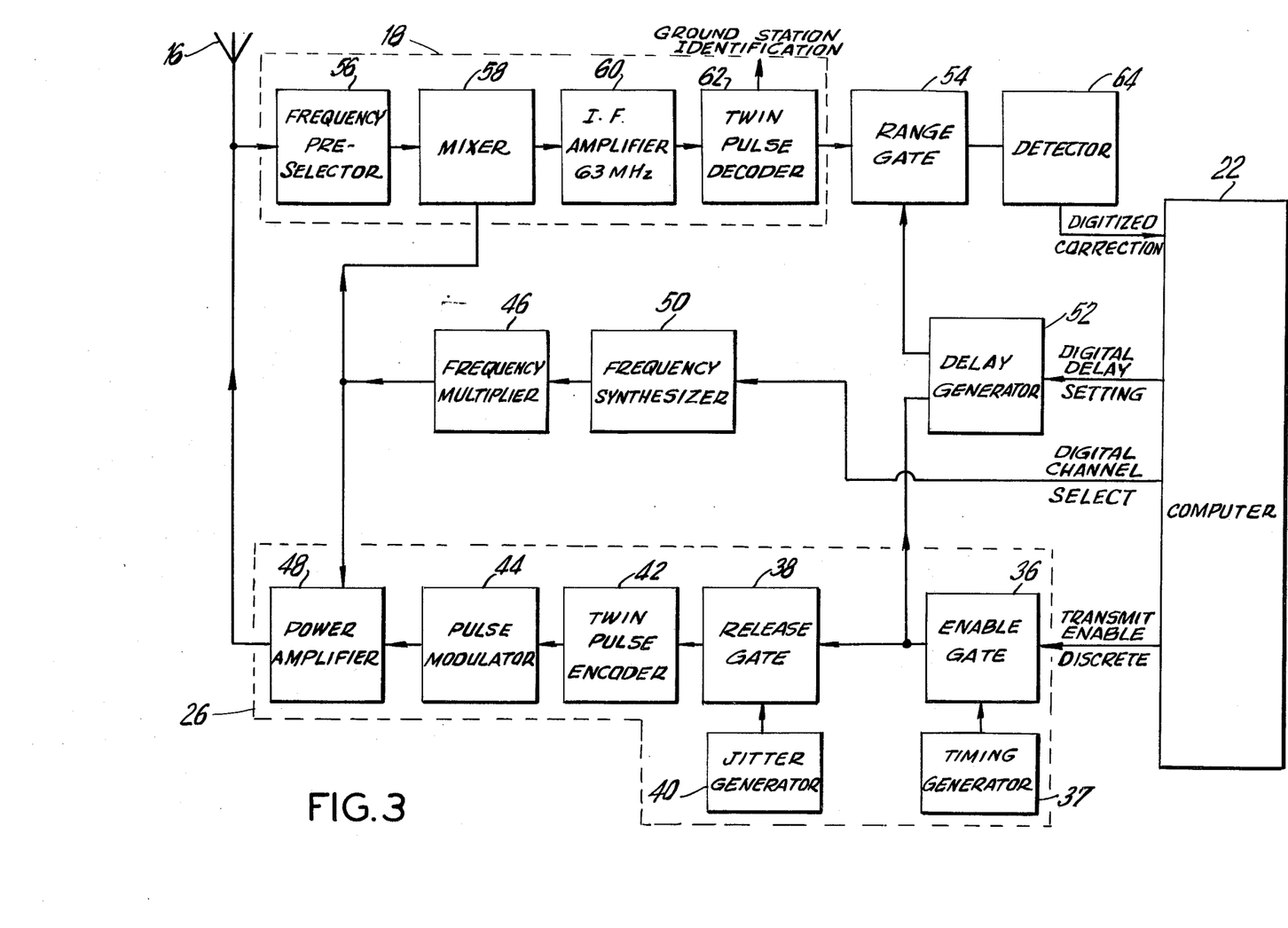
FIG. 3 is a detailed block diagram of the apparatus shown in FIG. 2.

Referring also to FIG. 3, the transmitter 26 includes an enable gate 36 connected to a timing generator 37, a release gate 38 connected to the enable gate 36 and coupled to a jitter generator 40, a twin pulse encoder 42 connected to the release gate 38, a pulse modulator 44 connected to the twin pulse encoder 42, and a power amplifier 48 connected to the pulse modulator 44. The receiver 18 includes a frequency pre-selector 56 electrically coupled to the antenna 16, a mixer 58 electrically coupled to the pre-selector 56, an I.F. amplifier 60 electrically coupled to the mixer 58, and a twin pulse decoder 62 electrically coupled to the I.F. amplifier 60. The twin pulse decoder 62 also provides a ground station identification signal, which may be suppressed, as desired.

The output of twin pulse decoder 62 is electrically coupled to a range gate 54. The output of the range gate 54 is electrically coupled to a detector 64. The detector 64 digitally encodes the position of the transponded pulse within the range gate 54. This digitized signal is transmitted to the computer 22 with an interrupt to key the transfer.

To interrogate a ground station, e.g., 14A, the computer 22 must first be activated by the cockpit control 30, thereafter interrogation is automatic. An enable discrete signal is transmitted from the computer 22 to the enable gate 36 which is coupled to the timing generator 37. The output from the enable gate 36 activates the release gate 38 permitting transmission of a signal from the jitter generator 40 to the twin pulse encoder 42 and then to the pulse modulator 44. The output from the pulse modulator 44 is combined with a preselected carrier frequency from a frequency multiplier 46 and is amplified by the power amplifier 48. The output signal from the power amplifier 48 is transmitted to the antenna 16. A digital channel select signal from the computer 22 activates a frequency synthesizer 50 which in turn activates the frequency multiplier 46 to provide a carrier signal having the frequency corresponding to a particular DME station frequency. A digital delay setting signal from the computer 22 activates a delay generator 52 whose output controls the time positioning of range gate 54.

During initial acquisition of a DME station, the computer 22 sweeps the range gate 54 by incrementing the digital delay generator 52 during successive pulse transmissions to the DME station to be acquired. The location and recurrence of the replies is recorded by the computer 22 to verify station acquisition.

The range gate 54 is characterized by two times, a delay $t_1$ measured from the start of transmission of the interrogating signal until transponded pulses are received from the DME ground station, and a width $t_2$ during which reply pulses are accepted. The width of the range gate 54 is fixed at a value sufficiently short that it is very improbable that more than one pulse pair will be received within the range gate width $t_2$. The delay $t_1$ depends upon the range to the DME station and is set by the computer 22.

Ideally, $t_1$ is set so that the reply pulse pair falls in middle of the interval $t_2$. Therefore ideally $t_1$ is set to the round trip time of the signals (which is directly proportional to range to the station) plus the delay at the DME ground station (nominally 50 $\mu$ seconds) plus half of $t_2$ (to put the reply in the middle of the gate). Since the range to the DME station generally changes between measurements, $t_1$ must be approximated based upon past measurements. Moreover the initial acquisition mode is provided for the condition when no past measurements are available.

In the initial acquisition mode, the gate range 54 is swept by computer control of $t_1$. Once a few DME stations have been acquired, it is not necessary to return to the acquisition mode to sequence among DME stations. The computer 22 continually estimates the aircraft's position and velocity, and the ground station bias errors from past range measurements. The aircraft's altitude is also known to the computer 22 from barometric altitude measurements. Together, this information is sufficient to accurately set the range gate 54 without returning to the initial acquisition mode of sweeping the gate.

The transmitter 26 is activated by the enable discrete and digital channel select signals from the computer 22. The selected channel frequency signal is transmitted to the DME station from the antenna 16. The DME ground station, having a frequency corresponding to the channel selected, receives the transmitted pulse pair and after a fixed nominal 50 μ sec. time delay, transponds the pulse pair back to the aircraft on a carrier frequency 63 MHz above or below the aircraft transmitting frequency.

The computer 22 provides a digital delay setting signal to the delay generator 52 which synchronizes the sweep of the range gate 54 with the 50 μ sec. delay in retransmission of the transponded pulses from the DME station. The range gate 54 only recognizes those transponded pulse pairs from the DME stations whose time of arrival subsequent to airborne transmission is within a preset tolerance of the time delay set by the computer 22.

Since the receiver 18 has a fixed frequency of operation 63 MHz away from the transmitter 26, a common local oscillator (frequency synthesizer 50) may be utilized for both reception and transmission, assuming the intermediate frequency of the receiver 18 is 63 MHz. Advantageously, the pre-selector 56 of the receiver 18 is tuned to a frequency which is 63 MHz away from the frequency of the transmitter 26 to prevent overloading.

The range gate 54 recognizes transponded pulses of the same pulse repetition rate and phase and rejects others. The detector 64 encodes the position of the transponded pulse within the range gate 54. The digitized output signal from the detector 64 is transmitted to the computer 22.

The detector 64 measures the round trip time of the transponded pulse pair by fixing the time of arrival of the transponded pulse pair. The detector 64 is protected from potentially interfering signals by the range gate 54. Additionally the twin pulse decoder 62 rejects any signals which are not in the proper pulse pair format. One form of detector 64 senses the magnitude of the envelope of the received pulse pair. When the magnitude of the received pulse pair exceeds a threshold dependent upon the automatic gain control of the receiver 18, an output signal is generated. The output signal stop a counter (not shown) which was activated at the start of the airborne transmission. Preferably, the detector 64 includes an "early gate" and "late gate". The received pulse pair is compared to replicas of the transmitted pulse pair slightly before and after the expected time of arrival of the received pulse pair. The degree of match between the received pulse pair and the two replicas is used to interpolate the time of arrival of the transponded pulse pair.

Switching between DME stations, i.e., a change in channel frequency, is initiated by the computer 22. The computer 22 maintains a list of DME station information in its memory. For each DME station in use by the airborne positioning system 12, the computer 22 maintains the station's channel number, latitude, longitude and elevation. In general there will be from three to 10 stations in current use, depending upon ground station availability.

Broadly, the steps involved in sequencing among the DME stations in use are as follows:

1. Using aircraft position and velocity derived from past measurements, the computer 22 predicts the range to the next DME station on its list at the time the actual measurement of range to the next DME station is to be taken.

2. The computer 22 then disables current transmission.

3. The computer 22 causes the frequency synthesizer 24 to be tuned to the frequency corresponding to the channel number of the next DME station.

4. The computer 22 sets the delay corresponding to the predicted range of the next station to determine the setting for the range gate 54 above, i.e., the computer 22 sets the value of $t_1$.

5. At the selected time of the next measurement, the computer 22 enables transmission on the frequency selected.

6. The range measurement is made by the detector 64 and transferred to the computer 22. (If no reply is observed from the DME ground station, the closing of the range gate 54 may be used to key a "no measurment" indication.).

7. The range measurement is used by the computer 22 to update the estimates of aircraft position and velocity, and the bias error associated with the DME station.

8. Steps (6) and (7) may be repeated as desired. If only one range measurement from a DME station is desired in a given sequence, transmission is disabled immediately after that range measurement is obtained.

9. The process is repeated beginning with step (1) for the next DME station. When the list of DME stations is exhausted, the DME station at the top of the list is reused so that cycling among the DME stations on the list is maintained.

In operation, the computer 22 changes the enable discrete signal to the enable gate 36 causing pulse transmission to be temporarily suspended. The computer 22 then changes the channel frequency by changing the digital channel select signal to the frequency synthesizer 50. A predetermined delay time is provided to enable the frequency synthesizer 50 to lock into the frequency selected by the digital channel select signal. Thereafter, the computer 22 energizes the delay generator 52 with a digital word signal that sets the delay time from the start of transmission to the opening of the range gate 54; then the enable discrete signal is changed by the computer 22 to enable the timing generator 37 to key pulse transmissions through the enable gate 36.

Upon receipt of a transponded signal by the range gate 54, the detector 64 issues a correction word indicating the position of the reply pulse within the range gate 54. If no reply pulse is detected within the range gage 54, an interrupt signal is generated by the detector 64. Preferably, a special bit configuration of the correction word, e.g., all ones, is utilized to indicate the absence of a reply.

In addition, to controlling the transmitter 26 through the enable gate 36, the frequency synthesizer 50, and the range gate 54, through the delay generator 52, the computer 22 provides reduction of DME range measurement errors. The filter program directs the computer 22 to combine the sequentially acquired range measurements from the DME stations with aircraft barometric altitude, determined by conventional sensing means, while estimating and removing range measurement errors to provide a C.E.P. position error of typically 75 feet. The polynomial filter weights for position, velocity, and acceleration are all functions of a single time-constant that regulates the degree of smoothing.

DME station errors consist generally of two components, a bias component and a random noise component. Bias errors are caused by an increase in the mean propagation path due to atmospheric refraction, by miscalibration of the aircraft transponder, ground station delays, and changes in the point of signal detection as a function of the received signal strength. Random errors (noise) are caused by fluctuations about the mean propagation delay due to local atmospherics, waveshape uncertainty, receiver quantization, and timing variations. The bias component remains constant for many range measurements from a given DME station, and is equal to the average value of the range measurement errors. Random errors cause fluctuations about the average value of the error from range measurement to range measurement. The bias component is typically about 400 feet R.M.S. and the noise component including signal level effects is typically about 200 feet R.M.S.

If DME stations had no errors, the circles of constant range from three or more stations, assuming that stations are sampled simultaneously, would intersect a single point, providing the true position of the aircraft. However, with errors, the range circles pass near the true aircraft position.

The computer 22 converts the sequence of range measurements into estimates of aircraft position, aircraft velocity, and DME station range. Algorithms which convert measurements into estimates of desired quantities are known as filters. Two types of filters may be used with the present invention:
1. The polynomial filter; and
2. The Kalman filter.

These filters both employ the well-known least-squares principle. The polynomial filter is simple, computationally fast, insensitive to round-off error, and requires a minimum of computer storage. The Kalman filter, while lacking these attributes, is generally more accurate in overall positioning due to its greater sophistication. The general theory of both polynomial and Kalman filters is provided in *Introduction to Sequential Smoothing and Prediction*, by N. Morrison, McGraw-Hill (1969).

Whether implemented by Kalman filter or polynomial filter, the computer program must perform the following operations:
1. Use past information of position, and other parameters, together with range measurement derived corrections to produce updated estimates of position and other parameters.
2. Predict upcoming range measurements, using predicted position, barometric altitude, the station location, and the estimated value of station bias error.
3. Control the sequencing of stations and the acquisition of range measurement data.
4. Check for measurement validity.
5. Compute position and bias corrections based upon the difference between the predicted and the actual range measurement.
6. Check for initialization modes and provide modified processing and control in these modes.

In the polynomial filter, the bias estimation and updating is performed in the following steps:
1. When the airborne positioning system 12 is initially activated, the station bias estimates are set nominally to zero, i.e., $B_i = 0$ for $= 1, \ldots, N$ for N stations in the list of stations.
2. When the airborne positioning system 12 is initially activated, there is an initialization period for the position and velocity estimates. As explained below, the filter operates in this mode until the velocity and position estimates fall within preset limits. During this period, the bias estimates are not changed.
3. After the initialization mode, whenever a measurement is obtained, a measurement residual is computed. The measurement residual is defined as the difference between the prediction of the range measurement based upon past data and the actual range measurement observed. Recall that the predicted range measurement is also used to set the range gate 54 in anticipation of the incoming pulse pair.
4. The total number of measurements obtained from the DME station corresponding to the new measurement is incremented. Thus, if $M_i$ is the number of measurements that have been obtained from the $i$th station, $M_i$ is replaced with a new value according to $M_i \leftarrow M_i + 1$.
5. The bias estimate of the $i$th station is then updated according to $$B_i \leftarrow \frac{(M_i - 1)}{M_i} B_i + \frac{\Delta R}{M_i}$$

where $\Delta R$ is the residual. This is simply the recursive average of the measurement residuals.
6. The procedure is again repeated starting with step (3) as more data is collected.

With the above procedure, if a measurement is missed because the DME ground station does not reply or a wild point occurs (an obviously bad measurement detected by comparing the position estimate to preset limits is a wild point) then steps (4) and (5) are skipped, leaving the bias estimate unmodified. If a new station is to be added to the list of stations in current use; say as a replacement for the $k$th station, the values $B_k = 0$ and $M_k = 0$ are set when the station is added.

Figure 4:
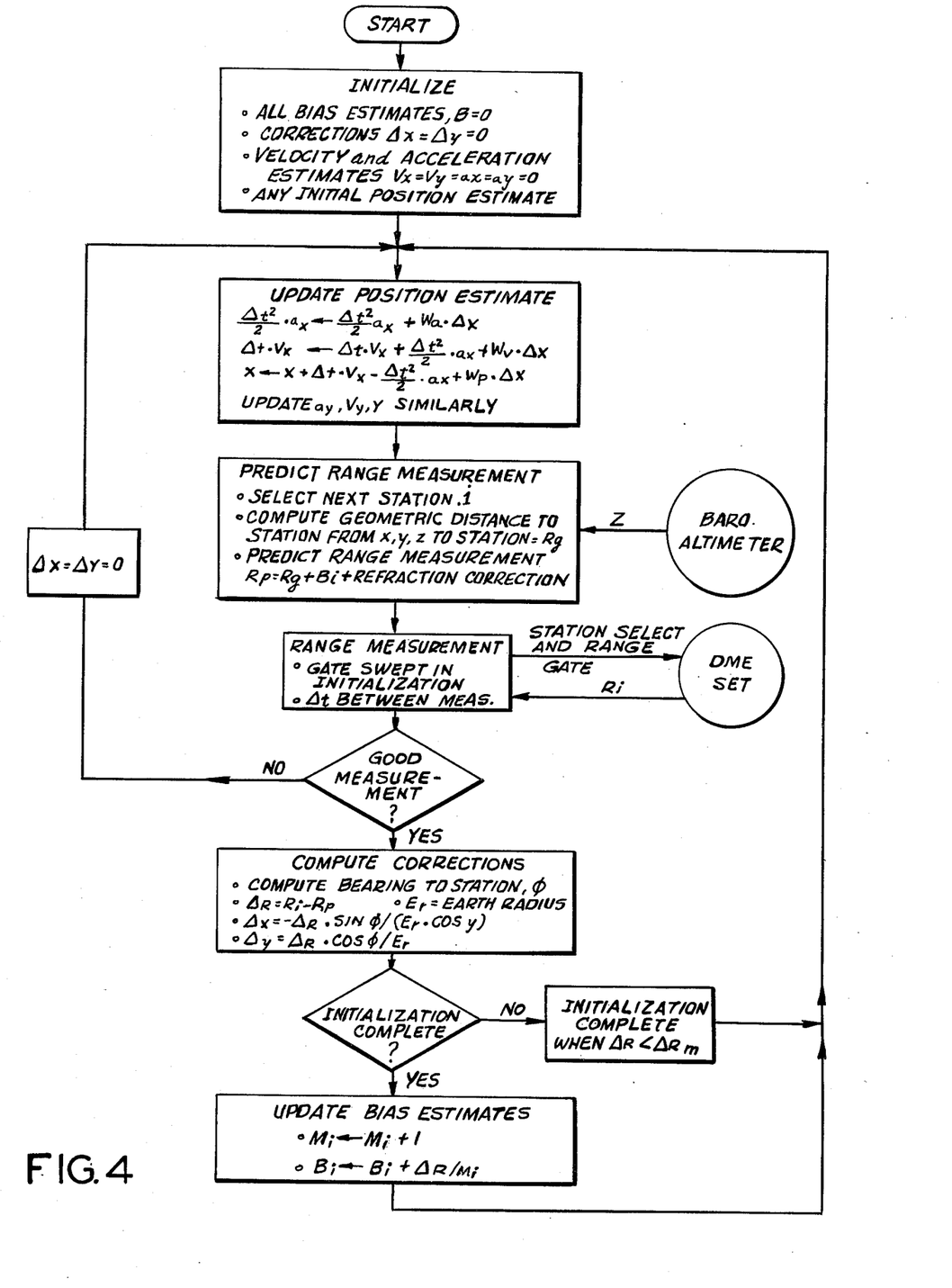
FIG. 4 is a flow chart of the computer program to be used with the present invention.

Referring to FIG. 4, a flow chart is provided showing implementation of these procedures using a polynomial filter as the positioning and predicting algorithm. The flow chart is discussed below with reference to the individual blocks:

START — The airborne positioning system 12 is activated by operator control.

INITIALIZE — The bias estimates associated with each of the stations to be used are set to zero. The corrections used for updating the position, velocity, acceleration, and bias estimates are set to zero. The estimates of aircraft velocity and acceleration components are set to zero. An arbitrary aircraft position is assumed. The initial position estimate may be taken as the coordinates of one of the ground stations.

UPDATE POSITION ESTIMATE — The corrections $\Delta X$, $\Delta Y$, are used to update the estimates of aircraft position (X,Y), velocity ($v_x$, $v_y$) and acceleration ($a_x$, $a_y$). X denotes the longitudinal component, and Y the latitude component, both expressed in radians. The equations utilize $\Delta t$, the time between range measurements, and weighting factors $w_a$, $w_v$, and $w_p$. The equations and the relationship among the weighting factors are derived in N. Morrison, previously referenced.

PREDICT RANGE MEASUREMENT — The stations are sequenced as previously described. The predicted range measurement, as a time setting for the range gate 54, is twice the geometric distance from the estimated aircraft position to be selected to the station divided by the speed of light, plus 50 microseconds, plus the station bias error (as a time error), plus a refractive index correction. The refractive index correction accounts for the varying speed of propagation in the atmosphere, and is well known. In addition, an empirical calibration curve may be advantageously used to correct for mean error as a function of range or power level.

RANGE MEASUREMENT — A range measurement is attempted, with the range gate 54 swept if the system 12 is in the initialization mode, otherwise by setting the range gate 54.

GOOD MEASUREMENT — If a valid measurement is not obtained, the corrections $\Delta X$ and $\Delta Y$ are set to zero and another measurement is attempted with further extrapolation of past data. If a good measurement is obtained, the program proceeds to computation of the corrections.

COMPUTE CORRECTIONS — The bearing to the station is computed as the geometric spherical angle from true north to the DME station. The vertex of the bearing angle is used as the estimated position of the aircraft. The residual $\Delta R$, the difference between the actual and the predicted range measurement, is calculated and used to determine $\Delta X$ and $\Delta Y$.

INITIALIZATION COMPLETE — The residual is tested to determine if the initialization mode is completed if the system is in the initialization mode. The initialization mode is completed when the observed residual is less than a preset value (about 1000 feet). In addition other limits on the values of velocity and acceleration estimates may be established. If the initialization is complete, the program proceeds to the updating of the bias estimates, otherwise it returns to the position updating.

UPDATE BIAS ESTIMATES — The update of the station bias estimates was previously discussed. It should be noted that the weighting factors weight the bias error estimates for each actual range measurement in accordance with the distance of the aircraft 10 from the DME station 14.

The two main changes in the flow chart for the Kalman filter are (1) the bias estimates are updated with the position estimates, and (2) a two step initialization process is used. The extra initialization employs the polynomial filter to provide initial estimates of position and velocity for the Kalman filter.

Appendix A, attached, provides the program listings for the Kalman filter, with a polynomial filter given as part of the initialization for the Kalman filter. The programs set forth in Appendix A (10 pages) are written in FORTRAN IV (as implemented on the CDC 6000 computer series) and set forth the logical flow and computational sequence for the preferred implementation of the algorithms. Further modifications of these programs to adapt them to the particular airborne computer used, and provide for real time sequencing and hardware control are well within the capability of engineers of ordinary skill who are engaged in airborne positioning system design.

An estimate of the aircraft position is found from the acquired range data using the filter program previously discussed. With this position estimate, the error associated with each range measurement is estimated from the range residuals. The residuals are the differences between the measured ranges and the new estimates of the ranges derived from the least-squares estimate of position. Averaging these residuals as the aircraft moves along its trajectory yields estimates of the biases associated with the stations. The estimated bias error is subtracted from the new range data, thereby reducing that component of the range error.

The filter algorithm also minimizes the effects of the random component of the measurement by smoothing the position and velocity estimates. Reduction of noise errors could also be achieved by filtering multiple interrogations to the same station.

As previously mentioned, the accuracy of the system 12 increases with the number of DME stations used, i.e., the higher the rate at which the computer 20 switches between DME stations, the better the performance of the system 12. A switching rate of one station every 1 and one-half seconds would generally provide a C.E.P. of about 150 feet. Whereas, a switching rate of 10 stations per second would generally provide a C.E.P. of typically 75 feet.

In summary, it will be appreciated that the computer controlled airborne positioning system sequences rapidly among at least three DME stations enabling bias errors to be effectively estimated and removed from the range measurements to provide an accurate determination of aircraft position. Moreover, once the bias errors are estimated, system accuracy will improve even when utilizing only one or two DME stations; this may be important for landing approaches which provide access to only one or two DME stations due to terrain blockage.

It should be understood by those skilled in the art that various modifications may be made in the present invention without departing from the spirit and scope thereof, as described in the specification and defined in the appended claims.

What is claimed is:

1. A method of accurately determining the position of an aircraft, including the steps of:
    a. sequentially transmitting pulses having preselected frequencies corresponding to the frequencies of at least three preselected fixed DME stations;
    b. switching the frequencies of the transmitted pulses to sequentially acquire each one of the fixed DME stations;
    c. sequentially receiving corresponding pulses transponded by the fixed DME stations;
    d. providing a predicted range measurement to the next one of the fixed DME stations in the transmission sequence based on prior measurements of aircraft position and velocity;
    e. determining the actual range measurement to the next one of the fixed DME stations in the transmission sequence;
    f. comparing the predicted range measurement with the actual range measurement;
    g. estimating the bias error in the actual range measurement for the next one of the fixed DME stations in the transmission sequence based upon the results of the comparison of step (f); and
    h. subtracting the estimated bias error from the actual range measurement to provide a corrected range measurement to the next one of the fixed DME stations in the transmission sequence.

2. The method recited in claim 1 including the step of:
    i. continuously updating the estimated bias errors which are subtracted from the actual range measurements for each fixed DME station.

3. The method recited in claim 1, including the step of:

j. smoothing the measurements of aircraft position and velocity to substantially reduce random errors.

4. The method recited in claim 1, including the step of:

k. weighting the bias error determined for each actual range measurement to a fixed DME station in accordance with the distance of the aircraft from the fixed DME station as determined by the actual range measurements thereto.

5. The method recited in claim 1 wherein: the frequencies of the transmitted pulses are switched to sequentially acquire approximately 10 fixed DME stations.

6. An airborne positioning system for an aircraft, comprising:
variable frequency transmission means for transmitting pulses having preselected frequencies which frequencies correspond to the frequencies of a preselected plurality of fixed DME stations;
receiving means for receiving the transponded pulses from the fixed DME station having a frequency corresponding to the frequency of the transmitted pulses;
a range gate for determining an actual range measurement;
computer means for controlling the position of said range gate to provide a predicted range measurement to the fixed DME station whose frequency corresponds to the frequency of the transmitted pulses in accordance with prior measurements of aircraft position and velocity;
said computer means comparing the predicted range measurement with the actual range measurement for the fixed DME station to provide a bias error therefore and subtracting the bias error from the actual range measurement to provide a corrected range measurement to the fixed DME station.

7. The airborne positioning system recited in claim 6, wherein:
said computer means stores the bias estimates for each of the fixed DME stations and updates the bias errors by averaging each bias error associated with an actual range measurement to a fixed DME station with bias errors resulting from past actual range measurements to the same fixed DME station.

8. The airborne positioning system recited in claim 6, wherein:
said computer means smoothes the aircraft position and velocity measurements.

9. The airborne positioning system recited in claim 6, wherein:
said computer means sequentially switches the frequency transmitted by said variable frequency transmission means to enable said receiving means and said range gate to acquire between approximately 0.7 to approximately 10 fixed DME stations per second.

10. The airborne positioning system recited in claim 6, wherein:
said computer means weights the bias estimate for each actual range measurement taken in accordance with the distance of the aircraft from each fixed DME station as determined by the actual range measurements.

11. The airborne positioning system recited in claim 6, including:

detector means coupled to said range gate for digitally encoding the position of the transponded pulses within said range gate to supply a digital output signal to said computer means.

12. A method of accurately determining the position of an aircraft, including the steps of:

a. transmitting pulses having a predetermined frequency corresponding to the frequency of one of at least three preselected fixed DME stations in use for receiving pulses;

b. receiving the corresponding pulses transponded by the one DME station;

c. providing a predicted range measurement to the one DME station in accordance with prior measurements of aircraft position and velocity;

d. determining the actual range measurement to the one DME station;

e. comparing the predicted range measurement with the actual range measurement to the one DME station;

f. estimating the bias error in the actual range measurement to the one DME station in accordance with the results of the comparison of step (e);

g. subtracting the estimated bias error resulting from step (f) from the actual range measurement resulting from step (d) to provide a corrected range measurement to the one DME station;

h. continuously sequencing among the DME stations in use to provide at least one corrected range measurement for each DME station in use during a sequence; and i. continuously repeating the sequence of steps (a)–(h) as desired to continuously cycle through the DME stations in use to continuously update the position of the aircraft during its flight.

13. The method recited in claim 12, including the step of:
continuously updating the bias error for each actual range measurement for each fixed DME station in use in accordance with the difference between the predicted and actual range measurements for each of the fixed DME stations and the distance between each fixed DME station and the aircraft as determined by the actual range measurements thereto.

14. The method recited in claim 12, including the step of:
providing an initial acquisition mode in which the bias errors are set to zero and an arbitrary aircraft position is assumed.

15. A method of accurately determining the position of an aircraft, including the steps of:

a. storing a predetermined list of fixed DME stations;

b. setting the position of a range gate in accordance with a predicted range measurement to a selected DME station;

c. transmitting pulses having a predetermined frequency corresponding to the frequency of the selected DME station;

d. taking an actual range measurement to the selected DME station in accordance with position in the range gate of corresponding pulses transponded by the selected DME station;

e. comparing the position of the range gate as determined by the predicted range measurement with the position of the transponded pulses received in the range gate;

f. estimating the bias error in the actual range measurement to the selected DME station in accordance with the results of step (e);

g. subtracting the estimated bias error resulting from step (f) from the actual range measurement resulting from step (d) to provide a corrected range measurement to the selected DME station;

h. repeating steps (a)–(g) with each fixed DME station on the predetermined list of DME stations to accurately determine the position of the aircraft during flight.

16. The method recited in claim 15, including the step of:

i. continuously repeating steps (a)–(h) as desired to continuously cycle through the predetermined list of DME stations to continuously update the bias errors associated with each actual range measurement to each sequentially selected DME station to provide a more accurate indication of aircraft position.

17. The method recited in claim 15, including the steps of:

providing an initial acquisition mode in which the bias errors for each of the predetermined fixed DME stations are set to zero and an arbitrary aircraft position is assumed;

sweeping the range gate to obtain actual range measurements prior to setting the range gate.

* * * * *